Figure 1:
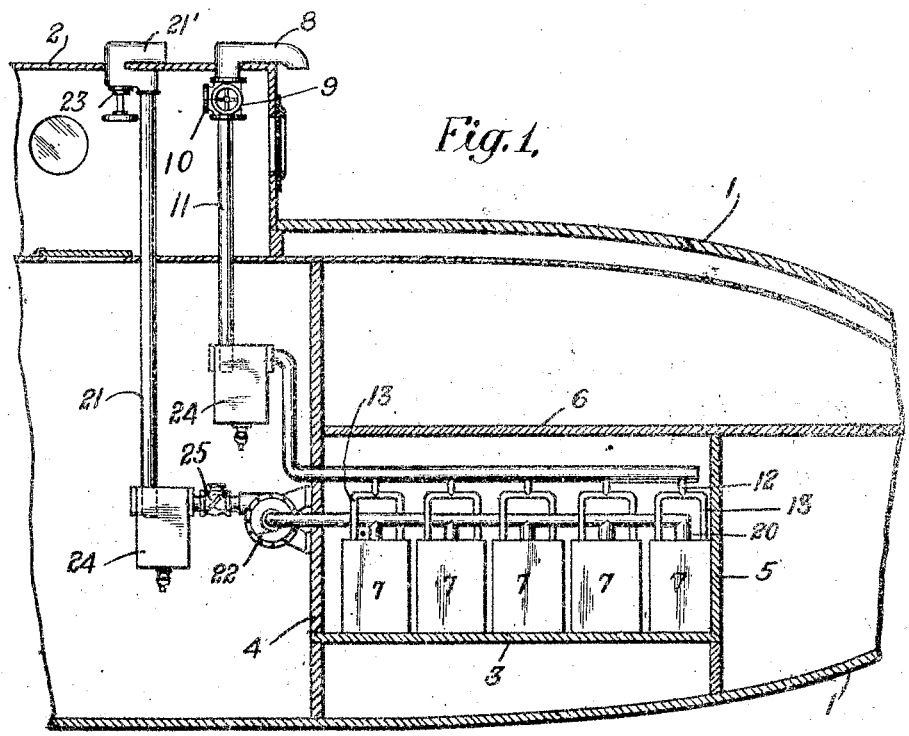

A. S. HUBBARD.
VENTILATION SYSTEM FOR STORAGE BATTERY CELLS.
APPLICATION FILED DEC. 31, 1914.

1,206,850.  
Patented Dec. 5, 1916.

WITNESSES  
John O. Gumper  
Herbert Hassler

INVENTOR  
Albert S. Hubbard  
BY  
Kenyon & Kenyon  
ATTORNEYS

UNITED STATES PATENT OFFICE.

ALBERT S. HUBBARD, OF NEW YORK, N. Y., ASSIGNOR TO GOULD STORAGE BATTERY COMPANY, A CORPORATION OF NEW YORK.

VENTILATION SYSTEM FOR STORAGE-BATTERY CELLS.

1,206,850.  Specification of Letters Patent.  Patented Dec. 5, 1916.

Application filed December 31, 1914. Serial No. 879,854.

*To all whom it may concern:*

Be it known that I, ALBERT S. HUBBARD, a citizen of the United States, and a resident of New York city, New York county, State of New York, have invented a Ventilation System for Storage-Battery Cells, of which the following is a specification.

My invention relates to storage batteries and particularly to means for ventilating the cells, particularly when the cells are sealed in such a way that no foreign matter in the immediate vicinity thereof may enter them.

Devices embodying my invention are particularly useful in connection with submarine vessels, or in any place where sea-water may come in contact with, or even submerge the cells. I am aware that it has been proposed to draw the gases from the cells of a storage battery in a submarine vessel and discharge them at a point outside of the vessel, air being admitted to the cells through the open tops thereof. This system, however, provides no protection for the cells from sea-water splashed upon them, or which may flood the battery compartment. It is well-known that if sea-water enters storage battery cells and comes into contact with the electrolyte, gases are formed and given off which are disagreeable to persons in the vessel and injurious to the delicate parts of metal instruments. I am aware that it has been proposed to deliver air under pressure to the interior of sealed battery cell casings, at a point above the surface of the electrolyte and to provide an outlet pipe extending from within the separate sealed cells, and out of which the gases under pressure escape. But in a system in which many pipes lead into and out of closed cells, great difficulty is encountered in making tight the connections of the pipe with the battery casing; and therefore, if a pressure is maintained within the cell of the battery, as in the old systems above referred to, the noxious gases are driven from within the battery to the interior of the vessel; and only a part of them is forced through the exhaust pipe. Wherever, however, gases are drawn through a pipe or a battery, the only effect of a leak is to admit air to the suction pipe, the gases within the same being all retained therein. An additional advantage of providing means for drawing the gases from within the battery casings is that any noxious gases formed within the compartment, but outside of the battery casings, by the overflow of acid into the bottom of the compartment, and the mixing with sea-water therein, are drawn into the exhaust pipe through whatever leaks there may be therein. This provides for emptying the compartment as well as the battery casings of noxious gases, whereas a system in which there is pressure within the battery casings, not only does not empty the compartment, but tends to fill it with gases formed within the battery casings, as well as those formed within the compartment itself.

The main object of my invention is to provide a system for ventilating batteries wherein air from a point outside of the compartment in which the battery is inclosed, is drawn into the cells of the battery and the gases in the cells are drawn out to another point outside of the battery compartment. A further advantage derived from this system is that the battery plates and connections are cooled by the same flow of air and gas which ventilates the battery. The functions of ventilating and cooling are both provided for and the system is, at the same time, one which protects the battery from any inflow of sea-water or other foreign material.

My invention will be more readily understood and the objects, advantages and features thereof will more fully appear from the following description, taken in connection with the accompanying drawings, forming a part of this specification, and in which:—

Figure 2:
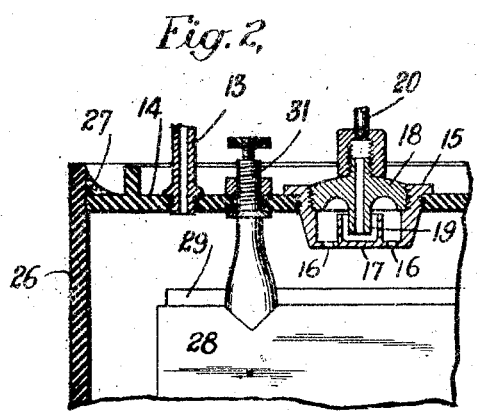
Figure 3:
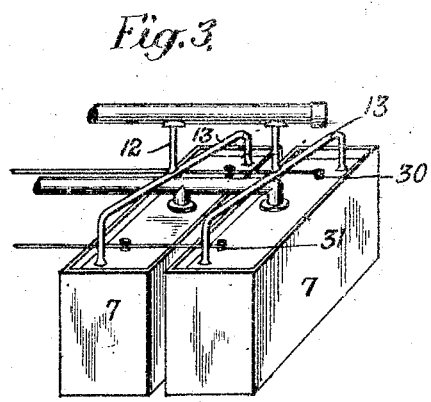

Figure 1 is a partial longitudinal vertical section through a submarine vessel, showing the battery compartment, the batteries therein and the ventilating system. Fig. 2 is a partial section through a single cell on a line passing through one inlet connection, one terminal and the outlet connection. Fig. 3 is a perspective view of two cells, showing the general arrangement of intake, outlet pipes and battery terminals.

The submarine vessel shown comprises a casing 1 and the conning tower 2. The battery compartment of the vessel comprises a bottom 3, end partitions 4 and 5, and a top 6, and it is supported by the casing 1 of the vessel. Upon the bottom 3 rest the storage battery cells 7. The intake nozzle 8 leads from the exterior of the vessel at the top of the conning tower to the interior of the vessel. Attached to this intake nozzle 8 is a three-way valve 9, which is connected to an auxiliary intake pipe 10 and to the main inlet pipe 11. The three-way valve 9 is so arranged that air may be drawn into the pipe 11 either through the intake nozzle 8 when the conning tower of the vessel projects above the surface of the water or when the vessel is entirely submerged air may be drawn from the interior of the conning tower through the auxiliary intake pipe 10. The inlet pipe 11 extends through the end partition 4, and has connected thereto short sections of pipe 12, which are in turn, connected to the middle of individual inlet pipes 13 of inverted U shape. The ends of the individual inlet pipes pass through the cell cover 14 at diagonally opposite corners of each cell. An intake manifold is thus formed by the pipe 11, the short pipe sections 12 and the individual inlet pipes 13. Into the center of the cell cover 14 is screwed a plug 15, which has a hole therethrough, and extends downwardly into the cell. In the lower end of this plug is supported by arms 16, a cup 17. Into the hole of this plug 15 is screwed a cap 18, which has an opening in it, around which is a flange 19, which extends downwardly into the cup 17. This cup 17, extending as it does over the flange 19, prevents any of the electrolyte of the battery from being drawn out through the outlet pipe. Communicating with the opening of this cup in each cell is a short pipe 20, each of which is connected to the main exhaust pipe 21, therewith forming an exhaust manifold. The exhaust pipe 21 leads to the exhaust fan 22 and then to the conning tower, where it is connected with the exhaust nozzle 21', in which is a closing valve 23. In the exhaust pipe 21, and in the inlet pipe 11, there are catch basins 24, which collect any water which may leak into the pipes leading from the conning tower. Between the exhaust fan 22 and the catch basin 24 in the exhaust pipe, there is a check valve 25, to further protect the batteries from inflowing sea-water.

Each sealed cell casing comprises the battery jar 26 and the cover 14, sealed therein by a ring of pitch or tar 27. Within the casing are the plates 28 and 29, from which the terminals 30 and 31 respectively lead through the cell cover 14 at points between the points of entrance of the inlet pipes 13 and the point of exit of the outlet pipe.

From the structure which has been described it is seen that a means has been provided for conducting pure air to the interior of sealed battery cells at points near diagonally opposite corners and for drawing from within the interior of said cells at a point near the center of the top thereof gases which may be formed in said cells and then forcing said gases to a point outside of the vessel. The cells are entirely sealed and the battery compartment may be completely flooded and no water will find its way to the interior of the battery to cause the production of chlorin or any other noxious gas.

What I claim and desire to secure by Letters Patent of the United States is:—

1. In a cooling and ventilating system for electric battery cells, a closed compartment for containing the battery, sealed battery cell casings in said compartment, an inlet pipe leading from a point outside of said compartment into said compartment, and comprising branches having sealed connections with said sealed casings, to provide communication with that portion of the interior of said sealed casings above the level of the electrolyte therein, an outlet pipe comprising branches having sealed connections with that portion of said sealed casings above the level of the electrolyte therein, to provide communication with the interior of the said sealed casings, and extending to a point outside of said compartment, and an exhaust pump attached to said outlet pipe.

2. In a cooling and ventilating system for electric battery cells, a closed compartment containing the battery, battery cells having covers sealed thereon to provide sealed casings, plates within the casings, an air inlet pipe leading from a point outside of the battery compartment and having sealed connections with said sealed casings at each end thereof, to provide communication with that portion of the interior of the sealed casings above the level of the electrolyte therein, an outlet pipe having sealed connections with the sealed casings at the center of the cover thereof, to provide communication with that portion of the interior of the casings above the level of the electrolyte therein and leading to a point outside of the battery compartment, terminals leading from the plates and extending through the covers at points between the points where the inlet pipe connects with and the point where the outlet pipe connects with the casings, and an exhaust pump attached to the outlet pipe.

In testimony whereof, I have signed my name to this specification, in the presence of two subscribing witnesses.

ALBERT S. HUBBARD.

Witnesses:
JOHN COLGARY,
EDWIN SEGER.